May 4, 1965
H. E. ELLINGSON ETAL
3,182,283
METHOD OF MEASURING THE VELOCITY OF AN
UNDERWATER MOVING SOUND SOURCE
Filed June 2, 1959
2 Sheets-Sheet 1
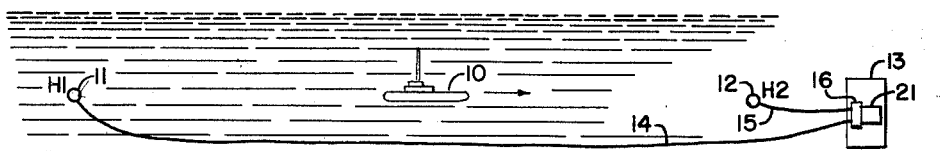
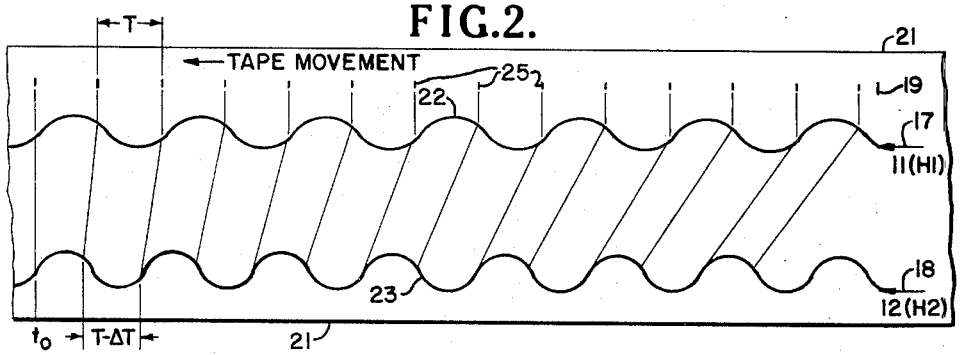
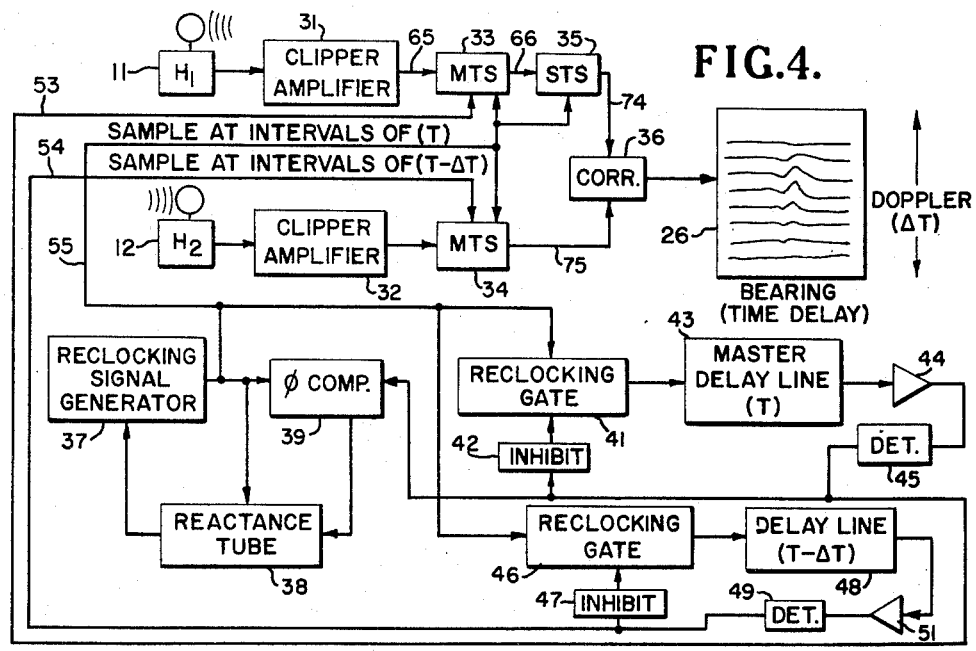
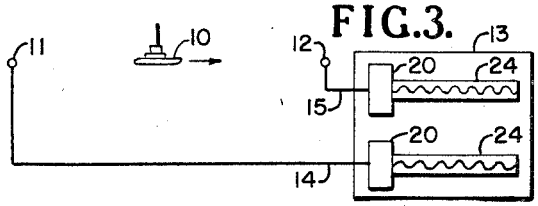
INVENTORS.
JOHN C. MUNSON
HERMAN E. ELLINGSON
ATTORNEYS.

INVENTORS.
H. E. ELLINGSON
J. C. MUNSON

United States Patent Office 3,182,283
Patented May 4, 1965

3,182,283
METHOD OF MEASURING THE VELOCITY OF AN UNDERWATER MOVING SOUND SOURCE
Herman E. Ellingson and John C. Munson, Silver Spring, Md., assignors to the United States of America as represented by the Secretary of the Navy
Filed June 2, 1959, Ser. No. 817,691
6 Claims. (Cl. 340—6)
(Granted under Title 35, U.S. Code (1952), sec. 266)

The invention described herein may be manufactured and used by or for the Government of the United States of America for governmental purposes without the payment of any royalties thereon or therefor.

This invention relates generally to the measurement of velocity of a sound emitting source moving through the water and more particularly to a method of comparison of signals received at two widely separated receiving stations from the moving sound source and measurement of the Doppler effect between the two signals caused by movement of the source therebetween and the calculation of a component of the velocity of the sound source therefrom.

In devices of this character heretofore devised it has been the usual practice to measure the velocity of underwater moving targets by determining the Doppler frequency shift between the outgoing ping signal from an observation station and the received signal reflected from the target. Such devices have not been altogether satisfactory under the conditions of service for the reason that the ping signal employed discloses to the enemy the presence of the station from which the ping signal originates and the location thereof.

The method of the present invention by reason of its passive nature possesses certain advantages over the prior art systems and none of the foregoing disadvantages.

In accordance with the present invention this desirable object is achieved by sensing the signals emitted by the moving sound source at two widely spaced receiving stations between which the source is moving, measuring the difference in time interval within which corresponding elements of the signal are received at the two stations as a result of the Doppler effect, and employing the information thus obtained to determine the velocity of the moving sound source.

One of the objects of the present invention is the provision of new and improved means for measuring the velocity of a sound emitting underwater moving source without disclosing the presence of the measuring device.

Another object is to provide a method for measuring the velocity of an underwater moving sound source by comparing signals received therefrom at two widely spaced receiving stations and measuring the time of reception of such signals as a result of the Doppler effect.

A still further object is the provision of new and improved means for bringing into substantial coincidence signals received from a sound emitting moving object at two widely spaced receiving stations between which the object is moving, which signals are displaced in time relation as a result of the Doppler effect, and calculating the velocity of the moving object therefrom.

Still other objects, advantages and improvements will become apparent from the following description taken in connection with the accompanying drawing of which:

FIG. 1 is a diagrammatic view of a system for underwater detection of a moving sound emitting object in accordance with one form of the invention;

FIG. 2 is a view of a length of tape upon which are recorded signals received from the two receiving stations of FIG. 1 respectively;

FIG. 3 is a view of the system of FIG. 1 according to an alternative form thereof;

FIG. 4 is a diagram of complete system suitable for use with the present invention in accordance with a preferred embodiment thereof;

Figure 5:
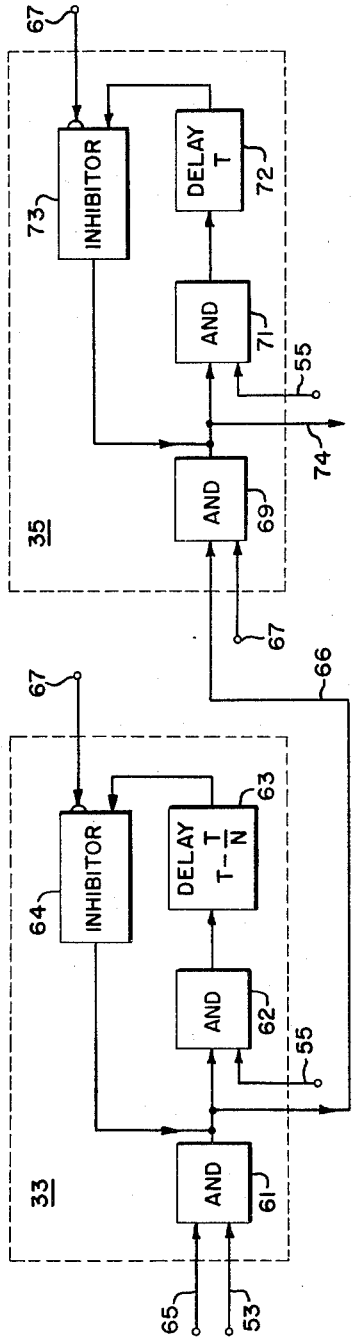
FIG. 5 is a schematic diagram of a portion of the system utilized in FIG. 4.

Referring now to the drawings on which like numerals of reference are employed to designate like parts throughout the several views and more particularly to FIG. 1 thereof there is shown thereon a moving source of sound 10 which may be, for example, a submarine or the like disposed within a body of water and a pair of detectors such as the sound receiving hydrophones or stations 11 and 12 illustrated between which the sound source is moving, the hydrophones being also designated for the purpose of description by the character $H_1$ and $H_2$ respectively. There is also disclosed a central station 13 to which the hydrophones 11 and 12 are connected as by cables 14 and 15 respectively thereby to establish an electrical connection between each of the hydrophones and a signal recording device 16 of any type suitable for the purpose such, for example, as a pen recorder or the device of FIG. 4, as the case may be. The pen recorder is preferably provided with two recording pens 17 and 18, FIG. 2, operatively connected to and controlled by the hydrophones 11 and 12 respectively. A third pen or marker 19 is also preferably provided to mark upon a moving tape 21 a series of uniform time markings 25 at intervals of time T thereby to facilitate the comparison of corresponding portions of the curves traced by pens 17 and 18 in time spaced relation.

If the object 10 is moving away from hydrophone 11 and toward hydrophone 12 as shown, the curve 22 traced by pen 17 and controlled by signals received from hydrophone 11 will be in variable time delayed relation with respect to the curve 23 traced by pen 18 in response to signals received from hydrophone 12 by reason of the well known Doppler frequency shift effect. As far as the signals from source 10 are concerned, time appears to run faster for hydrophone 12 than it does for hydrophone 11. The variation of this time delay has been illustrated on FIG. 2 in somewhat exaggerated form to facilitate the description and understanding of this feature of the invention. Thus if the signals from the two hydrophones are stored and lined up at some time such that corresponding portions of the two signals are exactly overlaid at time ($t0$) as indicated on FIG. 2, then corresponding portions of the recorded signals are increasingly out of line by an amount $\Delta T$ for each interval of time T as time increases. Thus, when selected portions of the two signals are compared, it is found that there is no time delay for which the two signals will correspond over the entire selected portions thereof. However, if the recorded signal from station or hydrophone 11 could be compressed in time slightly or the output of hydrophone station 12 expanded in time to a proper degree, the corresponding selected portions of the signals could be made to exactly overlay or coincide for any selected value of time. When the proper amount of time expansion or contraction, as the case may be, of the signals has been determined which will give a coincident relation of the signals received from each of the receiving stations 11 and 12, the component velocity of the sound source parallel to a line joining hydrophones 11 and 12 can be computed from this percentage value of expansion or contraction. Whereas on FIG. 1 is shown the pair of hydrophones 11–12 connected by cables 14–15 respectively, to a pen recorder 16, this arrangement is susceptible to many different variations and modifications. For example the hydrophone 11 may be connected to a pen recorder and the hydrophone 12 operatively connected to a second pen recorder and each of the recorders may be provided with an extensible tape on which the signals are recorded. Such an arrangement is shown on FIG. 3 on which the hydrophones 11–12 are connected to a pair of pen recorders 20, respectively, provided with moving tapes 24 on which are recorded signals received from the hydrophone respectively connected thereto. The tapes 24 are composed of extensible material suitable for the purpose such, for example, as rubber or any of the synthetic varieties thereof whereby a selected length of the tape bearing a recorded signal from one of the hydrophones may be elongated and shifted at will sufficiently to bring the recorded signal thereon into matching time phase coincidence with the corresponding signal recorded on the other tape, as will more clearly appear as the description proceeds. When this arrangement is employed it is merely necessary to select a predetermined length of tape bearing the recorded signal from hydrophone 12, in the illustrated example, and both shift and stretch this length of tape sufficiently to bring the signal recorded thereon into matching coincidence with a corresponding portion of the tape recorded by signals received from hydrophone 11. The percentage of elongation of the tape on which the signals from hydrophone 12 are recorded is thus easily determined and this percentage may be advantageously employed in the calculation of the velocity of the moving object 10.

Furthermore, if desired, the signals received from hydrophones 11 and 12 may be recorded on transparent tape or otherwise, and the signal received from hydrophone 12, in the illustrated example, may be optically enlarged to bring it into time phase coincidence with the recorded corresponding signal elements of the signal received from hydrophone 11. The percentage of optical enlargement required to effect this time phase coincidence relation may be ascertained by any well known means and employed in the calculation of the velocity of the moving object, as will more clearly appear hereinafter.

It will also be understood that whereas the hydrophones 11 and 12 are shown on FIG. 1 as connected to the signal receiving apparatus of station 13 by submarine cables, this is intended by way of example only as other means and instrumentalities may be employed for establishing a separate communication channel therebetween for each of the hydrophones. For example, the hydrophones each may be of the type known in the art as a sono-buoy which is provided with a radio antenna projecting above the surface of the water from which radio signals corresponding to acoustic signals received through the water are transmitted to a receiving antenna at station 13. Also, if desired, the signals from hydrophones 11 and 12 may be transmitted to the central station 13 by means of an acoustic telemetering link.

It is to be understood that the system is not limited to an underwater acoustic case, that the same principles also apply in an air acoustic case and the data processing techniques used in these two cases would be substantially the same. While the same principles apply in the case of electromagnetic waves being emitted from a source, the data processing techniques in such a case would tend to be quite different because of the large differences in frequency bands which would normally be used.

FIG. 4 is a block diagram of a complete system suitable for use with the present invention and which utilizes a plurality of delay line time compressors or Deltics which may be substantially the same as described in the copending application of John C. Munson, Serial No. 802,575, filed March 27, 1959. The acoustic signal detected by hydrophone 11 is fed to clipper amplifier 31 which converts it to a signal indicative only of the polarity of the detected signal. The output of clipper amplifier 31 is fed to a Deltic unit comprising moving time series element 33 and stationary time element 35 where it is sampled at uniform intervals of time T and stored first in a moving time series 33 for a predetermined interval and thereafter transferred to a stationary time series 35 for storage therein. The polarity of the output detected by hydrophone 12 is likewise clipped and amplified by clipper amplifier 32 and then fed to a Deltic unit comprising moving time series element 34 where it is sampled at intervals $T-\Delta T$ and stored.

The outputs of the stationary time series 35 derived from hydrophone 11 and of the moving time series 34 derived from hydrophone 12 are correlated together in correlator 36 which may take the form disclosed in the aforementioned application of Munson which compares polarities of its two inputs over a specified interval equal to the length of time required for all the samples stored in the stationary time series to be presented at the input of the correlator for comparison. At the conclusion of this comparison interval, the moving time series will have processed one sample with respect to this stationary time series thus generating an apparent delay between the two stored signals of one sample interval T. The polarity sampling process is facilitated by the inclusion of clipper amplifiers as shown in FIG. 4.

A new comparison is now made over the aforesaid comparison interval between the outputs of the two Deltics comprising the inputs to the correlator, at the end of which the moving time series processes one more sample interval with respect to the stationary time series. Thus effectively the hydrophone signals are compared over a predetermined interval after which one of these signals is delayed with respect to the other and the comparison is repeated over the same predetermined time interval. This delay and comparison process is repeated until the signals have been compared for all desired delays. Inasmuch as search in relative delay is equivalent to search in relative bearing of the object 10 with respect to the hydrophone pair 11–12 when spaced detectors are utilized, the output of the correlator thus consists of a comparison for a predetermined interval of the two stored signals corresponding to the acoustic signals received by hydrophones 11 and 12 for a number of selected bearings since one hydrophone has been sampled with intervals of T while the other has been sampled with intervals of $T-\Delta T$. This is equivalent to searching all of these bearings for a moving sound source with a given Doppler frequency shift in the received signal. By varying $\Delta T$ on successive sweeps it is possible to search in Doppler and if the output of the correlator is impressed upon a two dimensional recorder 26 such, for example, as an XY recorder, as shown, with, for example, time delay or bearing associated with the X axis and $\Delta T$ variations (or Doppler) on the Y axis, an output similar to that shown on FIG. 4 would result from a sound source moving between the two detectors. For the display illustrated the trace with the largest vertical displacement, as viewed on the drawing, would be selected as the one which gives the proper Doppler frequency shift while the bearing would be determined from the location with respect to the time delay as is of the peak of the correlogram on that trace.

It is necesary for the intervals T and $T-\Delta T$ to bear a precise relationship such that $$\frac{T}{T-\Delta T}=\frac{k}{1}$$

where $k$ and 1 are both integers, in order that the signals stored in the digital storage loops of the moving and stationary time series retain proper mutual time relationship. When these relationships are properly maintained, the output of the correlator accurately represents the correlation between the acoustic signals at hydrophones 11 and 12 for the chosen delay and Doppler frequency shift between the signals. The generation of intervals with these precise relations may be readily accomplished using techniques similar to those used successfully in generating moving time series and stationary time series. One means of generating the synchronized intervals is shown in the control circuit of FIG. 4 wherein the repetition rate of the reclocking signal generated by a reclocking signal generator is controlled by the master delay line of length T in such a way that the repetition rate of the output of the reclocking signal is exactly $$\frac{N}{T}$$

where N is a preselected integer.

This is accomplished by circulating a single pulse in the loop containing the master delay line. A pulse is inserted into the master delay line only when a signal is present at each input of the reclocking gate associated therewith. Since the reclocking signal is a series of very short pulses with a spacing of $$\frac{T}{N}$$

while the recirculated pulse has a width of approximately $$\frac{T}{N}$$

when it arrives at the input to the reclocking gate, the recirculated pulse determines which reclocking pulse will insert the next pulse into the master delay line, while the reclocking signal inserts this new pulse at a time precisely determined relative to the repetition rate of the reclocking signal. This repetition rate is controlled by the length of the master delay line in the following manner.

A phase comparison is made by phase comparator 39 between the $N^{th}$ cycle of the signal produced by reclocking signal generator 37 after the insertion of a new pulse into the master delay line and the aforesaid new pulse after it has passed through master delay line 43, amplifier 44 and detector 45 and fed to phase comparator 39. The voltage derived from this comparison is used to control reactance tube 38 in such a manner as to change the repetition rate of the reclocking signal so that the before described phase difference is a predetermined constant value. The frequency control system containing generator 37, reactance tube 38 and phase comparator 39 may take a form similar to that disclosed in FIGURE 18, pages 23 and 24 of the Armed Services Technical Information Agency report numbered 89313, entitled "The Deltic Correlator" written by Victor C. Anderson, dated January 5, 1956, and released by the Office of Technical Services on March 14, 1958.

The inhibit circuit 42 acts to prevent the simultaneous presence of more than one pulse in the master delay line loop. It has been found desirable in the Deltic to employ amplifiers 44 and 51 to increase the signal levels out of the delay lines 43 and 48 before detecting them with detectors 45 and 49, respectively. The circuitry associated with delay lines 43 and 48 may take a form similar to that disclosed in FIG. 15, pages 22 and 23 of the aforementioned report of Anderson. Each inhibit circuit, 42 and 47, is of like construction to the free running multivibrator therein disclosed.

Figure 6A:
FIG. 6 is a diagrammatic showing of various voltage waveshapes appearing in the circuit of FIG. 5.

The generation of the $T-\Delta T$ interval is accomplished by using a delay line 48 of length $T-\Delta T$ in a loop similar to the loop containing the master delay line 43. Since the time of the insertion of the pulse into the $T-\Delta T$ delay line is always controlled by the reclocking signal, it is not necessary that the length of the delay line be precisely $T-\Delta T$ in order to maintain the precise relationship required between the intervals T and $T-\Delta T$. The allowable variation in the length of the line would be at least plus or minus one-quarter of the period of the output of the reclocking signal. The search in Doppler could be accomplished either by inserting delay lines of various $\Delta T$'s into the $T-\Delta T$ loop shown or by maintaining a bank of synchronized loops, each with a line of different length and selectively connecting to the proper loop for each successive sweep. Thus it should now be apparent that short duration timing pulses (FIG. 6a) having a time separation of $$\frac{T}{N}$$

seconds, where N is the number of pulses produced by generator 37 in the delay period T, are supplied to moving time elements 33 and 34 in addition to stationary time element 35 by way of lead 55. The sampling pulses (FIG. 6b) having a width of $$\frac{T}{N}$$

seconds and a period T are fed from detector 45 to moving time series element 33 by way of lead 53. The sampling pulses appearing at the output of detector 49 area of the same width as those appearing at the output of detector 45 but differ in period by the time $\Delta T$. The output of the detector 49 is coupled to moving time series element 34 by way of lead 54.

The moving time and stationary time elements are preferably constructed as shown in FIG. 5 of the drawings.

Moving time element 33 contains an "AND" gate 61 to which is applied the sampling pulses (FIG. 6b) by way of lead 53. In addition, the amplified clipped signal representing the polarity of the signal detected by hydrophone 11 is fed to gate 61 by lead 65. The output gate 61 is coupled to "AND" gate 62 as is the timing signal, FIG. 6a, appearing on lead 55. The output of gate 62 is connected to delay line 63 which introduces a delay $$T-\frac{T}{N}$$

seconds into the signal fed thereto.

Figure 6B:
Figure 6C:
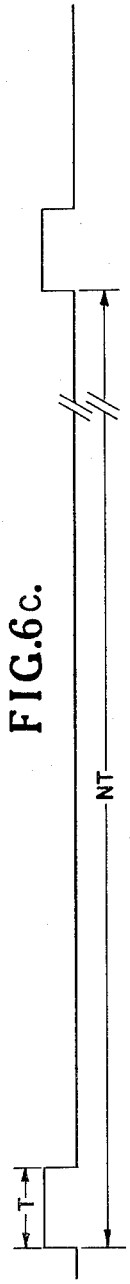

The signal obtained from delay line 63 is coupled to conventional "INHIBITOR" gate 64 which permits it to be fed back to "AND" gate 62 except when a voltage other than zero is applied to lead 67. The inhibit signal (FIG. 6c) coupled to gate 64 having a period of NT seconds has a value other than zero for T seconds and is zero for the remainder of the period. The leading edge of the inhibit pulse is synchronized with the leading edge of one of the sampling pulses (FIG. 6b).

The outputs of gates 61 and 64 are combined and fed to "AND" gates 62 and 69. The stationary time element 35 is of similar construction to moving time element 33 and contains gate 69 to which a signal of similar wave shape as the inhibit signal (FIG. 6c) is applied by way of lead 67. The output of gate 69 is supplied to an "AND" gate 71 as are the sync or timing pulses (FIG. 6a) appearing on lead 55. The output of gate 71 is applied to a delay line 72 of construction similar to delay line 63 which delays it by T seconds. Delay line 72 is connected to "INHIBIT" gate 73 to which is also applied the inhibit signal (FIG. 6c) appearing on lead 67. The signal developed by gate 73 is coupled back to gate 71 and to output lead 74.

It is to be understood that isolation elements, signal amplifiers, and vernier delays may be utilized in the moving and stationary time elements as may be necessary. The "AND" and "INHIBIT" gates may be of any conventional construction, such as shown in "Pulse and Digital Circuits," Millman and Taub, 1956 on pages 397–404.

The moving time series element 34 is constructed of components similar to those utilized in moving time element 33. The delay element, however, must be made variable so that the delay introduced to the signal applied thereto is $$T-\frac{T}{N}-\Delta T$$

The same timing and inhibit pulses are supplied to the gates therein as those supplied to moving time element 33. These pulses are fed into the gates of element 34 which correspond to the gates in element 33. However, the sampling pulses applied to moving time element 34 have a period of $T-\Delta T$ seconds and a duration of $$\frac{T}{N}$$

seconds. The sampling pulses are applied to gate 61 in element 33 by way of lead 54.

The operation of moving time element 33 will now be described in detail. The signal appearing on lead 65 will be fed through gate 61 whenever a sampling pulse (FIG. 6b) of period T and duration $$\frac{T}{N}$$

appears on lead 53. The output of gate 61 is fed through gate 62 to delay line 63 whenever a short duration timing pulse (FIG. 6a) having a period of $$\frac{T}{N}$$

is applied to gate 62 by lead 55. The output of delay 63 is coupled back to gate 62 by way of "INHIBIT" gate 64 when a zero volt signal is applied to gate 64.

In this manner the signal on lead 65 will appear on lead 66 once every $$T-\frac{T}{N}$$

seconds for NT seconds. Thus the signal on lead 66 appears to progress from one position to the next every T seconds and it appears to be moving. Likewise, the output of moving time element 34 will be a series of pulses which appear on lead 75 and reoccur once every $$T-\frac{T}{N}-\Delta T$$

seconds for NT seconds.

The signal fed from moving time element 33 to stationary time element 35 is permitted to pass through gate 69 for only T seconds. The output gate 69 is recirculated in the stationary time element and will appear on lead 74 N times. After NT seconds a new signal which appears on lead 66 is recirculated in the stationary time element. Thus the positive voltage on lead 74 reappears every T second, does not progress in time and appears to be stationary.

Once the value of $\Delta T$ has been determined by whatsoever means employed, whether by the method shown in each of FIGS. 2, 3 or 4, as the case may be, the component velocity of the sound source along a line adjoining the detectors 11 and 12 may be determined by employing the following formula wherein the moving sound source is assumed to be moving between the hydrophones 11 and 12 and the velocity of propagation of sound in water has been assumed to be 4,800 ft. per second. This formula can, of course, be adjusted to take care of variations in the velocity of propagation.

$$V = 1440 \frac{\Delta T}{T}$$

When employing this formula the value of V obtained therefrom is in knots.

Assume, for example, that the ratio of $\Delta T$ to $T$ measured by the method of either FIGS. 2, 3, or 4 is 1/100, and the sound source is moving between the two hydrophones. The component of velocity parallel to the line joining detectors 11 and 12 calculated by the foregoing formula is 14.4 knots.

While this invention has been described with particular reference to several examples which give satisfactory results, it is not so limited as it will be aparent to those skilled in the art, after understanding the invention, that various changes and modifications may be employed without departing from the spirit and scope of the invention and it is intended, therefore, in the appended claims to cover all such changes and modifications.

What is claimed as new and desired to be secured by Letters Patent of the United States is:

1. The method of measuring a component of velocity of a moving underwater sound source which comprises the steps of receiving a sound signal from said source at each of two sound receiving stations, the sound signal received at one of said stations being displaced variably in time with respect to the sound signal received at the other station, generating at each of said stations an electrical analogue signal corresponding to the sound signal received at the respective station, said electrical signals being variably displaced in the same time relation as the sound signals corresponding thereto, recording said electrical signals in the said variable time relation, correlating said electrical signals, measuring the percentage of time variation of said recorded signals, and calculating said component of velocity from the percentage thus measured.

2. A method according to claim 1 in which said correlating of said electrical signals is obtained by sampling portions of one of the recorded signals and by sampling portions of the other recorded signal which correspond to the portions of said one recorded signal at uniform predetermined intervals of time.

3. A method according to claim 1 in which said correlating of said electrical signals is obtained by sampling points of polarity reversals of one of the recorded signals, and by sampling points of polarity reversals of the other recorded signal for a period corresponding to the period which said one recorded signal is sampled.

4. A method according to claim 1 in which said correlating of said electrical signals is obtained by sampling portions of one of the recorded signals, by sampling portions of the other recorded signal which correspond to the portions of said one recorded signal, said sampling processes occurring at predetermined time intervals and multiplying the ordinates of the signal records thus sampled to obtain an optimum average matched value of the recorded signals.

5. Apparatus for determining a velocity component of a moving sound source comprising a first sound receiving means for receiving sound from said sound source, a second sound receiving means for receiving sound from said sound source, said second sound receiving means being located on the opposite side of said sound source from said first sound receiving means, said first sound receiving means operable to convert sound energy received into a first electrical signal, said second sound receiving means being operable to convert sound energy received by said second sound receiving means into a second electrical signal, a first moving time series element connected to said first sound receiving means, a stationary time series element connected to said first moving time series element whereby a stationary time series of sampled pulses is produced, a second moving time series element connected to said second sound receiving means, correlator means, means connecting said stationary time series element to said correlator means, means connecting said second time series element to said correlator means, means varying the sampling time of said second time series element in accordance with the Doppler effect caused by the movement of said sound source, whereby a component of the velocity of said sound source may be determined.

6. Apparatus for determining the component velocity of a moving sound source comprising a first transducer positioned for receiving sound energy from a moving sound source, a second transducer positioned for receiving sound energy from said sound source and spaced apart from said first transducer whereby a Doppler effect from a moving sound source may be produced, said first transducer operable to convert sound energy received into a first electrical signal having a time base, said second transducer operable to convert sound energy received into a second electrical signal having a time base, first recording means for recording selectable portions of said first electrical signal, second recording means for recording selectable portions of said second electrical signal, means connecting said first transducer to said first recording means, means connecting said second transducer to said second recording means, means in said second recording means for varying the time base of said second signal whereby the time base of said first and second electrical signals may be the same, means measuring the time base change of said second electrical signal, a correlator, means connecting said first recording means to said correlator, means connecting said second recording means to said correlator, said correlator operative to produce a maximum signal when maximum correlation between said first and second signals occur.

References Cited by the Examiner

UNITED STATES PATENTS

| | | | |
|---|---|---|---|
| 1,383,690 | 7/21 | Arnold | 340—6 |
| 1,785,307 | 12/30 | Hammond | 340—16 |
| 2,866,373 | 12/58 | Doyle et al. | 343—100.7 |
| 2,918,581 | 12/59 | Willey et al. | 343—100.7 |
| 2,958,039 | 10/60 | Anderson | 340—6 |

OTHER REFERENCES

NAVORD Report 4244 U.S Naval Ordnance Laboratory "Delay Line Time Compressor," Sept. 6, 1956, by Munson and Barton (pp. 1–29 and FIGS. 1–5 relied on).

CHESTER L. JUSTUS, *Primary Examiner.*